(12) United States Patent
Jurg

(10) Patent No.: US 7,110,054 B2
(45) Date of Patent: Sep. 19, 2006

(54) SWITCHABLE COLOR FILTER

(75) Inventor: Funfschilling Jurg, Basel (CH)

(73) Assignee: Rolic AG, Zug (JP)

( * ) Notice: Subject to any disclaimer, the term of this patent is extended or adjusted under 35 U.S.C. 154(b) by 0 days.

(21) Appl. No.: 10/493,631

(22) PCT Filed: Oct. 23, 2002

(86) PCT No.: PCT/CH02/00577

§ 371 (c)(1),
(2), (4) Date: Apr. 23, 2004

(87) PCT Pub. No.: WO03/036375

PCT Pub. Date: May 1, 2003

(65) Prior Publication Data

US 2004/0263732 A1 Dec. 30, 2004

(30) Foreign Application Priority Data

Oct. 24, 2001 (CH) .................................. 01811042

(51) Int. Cl.
*G02F 1/1335* (2006.01)
*G02F 1/1347* (2006.01)

(52) U.S. Cl. ..................... 349/18; 349/80; 349/104; 349/98; 349/97

(58) Field of Classification Search ................ 349/18, 349/78, 80, 74–76
See application file for complete search history.

(56) References Cited

U.S. PATENT DOCUMENTS

| 4,726,663 | A | | 2/1988 | Buzak |
| 5,548,422 | A | * | 8/1996 | Conner et al. ............... 349/98 |
| 5,686,931 | A | | 11/1997 | Funfschilling et al. |
| 5,751,385 | A | * | 5/1998 | Heinze ........................ 349/61 |
| 6,208,393 | B1 | * | 3/2001 | Bawolek et al. ............. 349/106 |
| 2001/0026340 | A1 | * | 10/2001 | Hasegawa et al. .......... 349/123 |
| 2002/0101554 | A1 | * | 8/2002 | Khan et al. .................. 349/133 |

FOREIGN PATENT DOCUMENTS

EP 0 422 687 4/1991

OTHER PUBLICATIONS

Bachels et al: "Advanced Electronic Color Switch for Time Sequential Projection" 2001 Sid International Symposium Digest of Technical Papers. San Jose, CA, Jun. 5-7, 2001, Sid International Symposium Digest of Technical Papers, San Jose, CA: Sid, US, vol. 32, Jun. 2001, XP002227327 Chapter: The Electronic Band Modulation Filter.

(Continued)

Primary Examiner—Andrew Schechter
Assistant Examiner—W. Patty Chen
(74) Attorney, Agent, or Firm—Sughrue Mion, PLLC

(57) ABSTRACT

The liquid crystal switchable color filter switches between three color bands and is preferably used for time-sequential color devices, as for example projection devices, direct view displays and video cameras. The color filter employs circularly polarizing selective reflection bands of at least four cholesteric filters (89, 91, 93, 95) together with three liquid crystal switches (81, 83, 85) and related retarder layers. Between the first and the second as well as between the third and the fourth cholesteric filter an additional half-wave plate (111, 113) is provided, which makes it possible to use cholesteric filters having all the same handedness. Furthermore, for the blocking state of a color band the optic axis of the corresponding liquid crystal switch is parallel or perpendicular to the polarization direction. This concept simplifies production and still exhibits excellent properties for the color switch. Moreover, it advantageously allows overlapping color transmission bands thus improving the light efficiency.

19 Claims, 10 Drawing Sheets

OTHER PUBLICATIONS

Schmitt K et al: "Fast Time-Sequential Color Switch Based on Cholesteric Filters and DHF-LCDS" Eurodisplay, XX, XX, Sep. 6, 1999, pp. 437-440, XP008002141 cited in the application.

Makow DM: "Peak reflectance and color gamut of superimposed left- and right-handed cholesteric liquid crystals" Applies Optic, Apr. 15, 1980, USA, vol. 19, No. 8, pp. 1274-1277, XP002197363 ISSN: 0003-6935 Chapter: III. Experimental Results Figures 1-3.

* cited by examiner

SWITCHABLE COLOR FILTER

The present invention relates to a liquid crystal switchable color filter and, in particular, to such a color filter that employs circularly polarizing selective reflection bands of cholesteric filters; and to time-sequential color devices, for example projection devices, direct view displays and video cameras, comprising said color filter.

Fast switching color filters which provide the primary colors RGB (Red-Green-Blue) synchronized with a fast imager represent the central unit of time sequential single panel video projectors. This projector type is of particular interest because of its compactness, low cost, and low weight. While the color filters generate the three color components of the full-color picture, the imager determines the gray levels of these components. If the switching frequency is sufficiently high the human eye simply integrates over the three color components and generates the intended mixed color. Analogously, time sequential direct view displays are possible, and there exist also color video cameras based on the time sequential technique. The latter generate three gray scale images of the three color components which can be back transformed to the color image by calculating the mixed color component or by time sequential projection.

Various designs of color switches have been proposed. One well-known solution for RGB color generation is the mechanical color wheel. Its main drawbacks are light induced degradation of the color filters used, large volume of the device, and jitter due to mechanical instabilities.

Another known solution are stacked retarder/polarizer combinations with liquid crystal switches, where unwanted color components are removed (absorbed) by the polarizer. However, these filters are difficult to produce. In particular, it is difficult to generate saturated colors with thin stacked retarders, and furthermore absorbing polarizers tend to degrade under high light levels.

A third known solution uses stacked cholesteric filters, combined with liquid crystal switches. Instead of being absorbed, the unwanted color component is reflected by the cholesteric filters. This alternative is particularly attractive because the high light level present in projectors tends to damage any absorbing component. Furthermore, cholesteric filters exhibit steep selective reflection bands which result in excellent color saturation. In addition, they generate circularly polarized light within the reflection band of the filter in accordance with its cholesteric helical structure which can be easily transformed to linear polarized light without loss of intensity.

Cholesteric filters are nematic liquid crystals with a helical structure with a pitch that is comparable to the wavelength of light. If crosslinkable nematic liquid crystals are used, the filters can be produced as thin films that can easily be combined with nonchiral retarders to form a complex stack structure.

Subtractive color switches and modulators based on cholesteric filters and liquid crystal switches are known and for instance described in the following publications: U.S. Pat. No. 5,686,931 (Fünfschilling et al.); J. Fünfschilling and M. Schadt, Novel LCD Color Projectors Based on Cholesteric Filters, SID International Symposium, Digest of Technical Papers, XXVI, 597–600 (1995); and K. Schmitt, J. Fünfschilling, M. Z. Cherkaoui and M. Schadt, Fast Time-Sequential Color Switch Based on Cholesteric Filters and DHF-LCDs, EuroDisplay '99: The 19th International Display-Research Conference, Proceedings,-437–440 (1999).

For comparison purposes, the general structure of a known color switch is also illustrated in FIG. 1, and a schematic representation of its elements is depicted in FIG. 3. The color switch consists of three stacked band modulation filters (BMFs) 1, 3, and 5, each capable of blocking one of the primary colors R, G or B by applying suitable voltages to the electrodes of the liquid crystal switches which are part of each band modulation filter. The filters are independent from each other in the sense that each filter controls a well defined wavelength band. At each switching state of the time sequential color switch, two color bands are blocked and one passes.

In FIG. 3, again the three stacked band modulation filters (BMFs) 1, 3, and 5 are shown. Each band modulation filter comprises a ferroelectric liquid crystal switch 21, 23 and 25; two quarter-wave retarders 27, 29, 31, 33, 35 and 37; an input cholesteric filter 39, 41 and 43; and an output cholesteric filter 45, 47 and 49. The handedness of each cholesteric filter is indicated by a "+" or "−", respectively. Unpolarized light 51 from a lamp is impinging from the left. Marked with reference numerals 53 and 55 are optional elements such as a polarizer and a retarder, which may be required at the input side, for instance in combination with a polarization recovery scheme. At the output side, one or more retarders 57 and 59 are provided to convert the circularly polarized light to linearly polarized light 61.

Independent BMFs in series are an optical concept which leads to highly saturated colors. It can be implemented with fast liquid crystal displays (LCDs), such as ferroelectric LCDs. Used on a pixel-to-pixel basis, it can also be used to generate true color projection systems.

Despite these advantages, the known cholesteric color switches with their concept of independent BMFs in series still have shortcomings. One is that the realization poses stringent production tolerances on the LCDs.

Another, conceptual shortcoming is that they represent not the most efficient way to split white light into saturated primary colors. The reason for this is a peculiarity of the human color perception: If one determines the brightest band-pass filters that produce a given color saturation, one gets filter bands that overlap unless the color saturation is extremely high. As an example, the ideal band-pass-filters to produce NTSC color coordinates from a white light source have transmission bands from 400 . . . 509 nm (B), 497 . . . 566 nm (G) and 588 . . . 700 nm (R), respectively. There is a considerable overlap (497 . . . 509 nm) of the blue and the green filter.

However, the requirement for the independent BMFs that at each switching state two color bands are blocked and one passes implies that the blocking bands of two adjacent colors must overlap. During the red period, for instance, no 'gap' is allowed between the green and the blue filter, or—in other words—the respective filter transmission bands may not overlap. Compared with the ideal case, therefore, half of the light in this wavelength region is lost by the requirement of non-overlapping filter transmission bands. For real filters with their finite steepness of the filter characteristics the light loss is even significantly higher.

A further shortcoming of the known cholesteric color switches can be explained with reference to FIG. 3. Each of the band modulation filters 1, 3, and 5 comprises two cholesteric filters, which have an opposite handedness of the cholesteric helix, but are otherwise identical. Sandwiched between the cholesteric filters are two quarter-wave plates and a liquid crystal switch. The liquid crystal switch acts as a rotatable half-wave plate. An important feature of this optical arrangement is, that the effective birefringence of the combination 'quarter-wave plate/liquid crystal switch/quarter-wave plate' is zero in the blocking state of the band modulation filter. In this state, the two other colors should pass unaltered, which is indeed true if the total birefringence is zero. Note that a change of polarization finally results in a reduced filter transmission. The precise degree of compensation to zero birefringence is not very critical in this respect. However, any residual birefringence changes the blocking power of the filter, leading to reduced color saturation. This imposes stringent tolerances for the optical retardation $\Delta$nd of the liquid crystal switch cell ($\Delta$n is the birefringence of the liquid crystal material, d the cell gap). In addition, some ferroelectric liquid crystal switch cells (e.g. DHF LC cells) have intrinsic variations of $\Delta$n that lead to significant (3 . . . 5%) residual transmission of the BMF in its blocking state.

Furthermore, the requirement of cholesteric filters with opposite handedness significantly increases production costs. This relates to the specific way cholesteric filters usually are produced. For the production, first a cholesteric monomer mixture between a set of dopants and a set of nonchiral nematic molecules is prepared. The dopant concentration is chosen such that the final filter has the desired position of the selective reflection band. This mixture is then further processed in the filter production. If both signs of handedness era required, the production costs increase for several reasons: (1) Keeping stock of two different types of chiral dopants is necessary. (2) Since chiral dopants are usually derived from natural raw products (which have only one handedness), one handedness is much cheaper than the opposite; it may even be necessary to use different sets of dopants for the left and the right handed cholesteric mixtures. (3) The actual properties of the final filter solutions depend on the details of the dopant/matrix interaction; this can lead to a completely different mixture design for the two cases. Thus, material costs, stocking costs and labor costs are higher if both signs of helix handedness are required in a color switch.

In view of the desired properties of a color switch and the above-mentioned different drawbacks of the prior art, a general object of the present invention is to accomplish a color switch that uses only cholesteric filters of the same handedness and still exhibits excellent properties.

The invention provides a liquid crystal switchable color filter for switching between a first, a second and a third color band, which switchable color filter comprises a first switchable liquid crystal cell, a first retarder layer which is a quarter-wave plate for the first color band, a first cholesteric filter having a selective reflection band for the first color band, a second cholesteric filter having a selective reflection band for the second color band, a second retarder layer which is a quarter-wave plate for the second color band, a second switchable liquid crystal cell, a third retarder layer which is a quarter-wave plate for the second color band, a third cholesteric filter having a selective reflection band for the second color band, a fourth cholesteric filter having a selective reflection band for the third color band, a fourth retarder layer which is a quarter-wave plate for the third color band, a third switchable liquid crystal cell, and a polarization blocking element, wherein the switchable liquid crystal cells are capable of at least two switching states, wherein the handedness of all cholesteric filters is the same, wherein a fifth retarder layer which is a half-wave plate is provided between the first and the second cholesteric filter and a sixth retarder layer which is a half-wave plate is provided between the third and the fourth cholesteric filter, and wherein for the blocking state of the respective color band the optic axis of the corresponding switchable liquid crystal cell is either substantially parallel or substantially perpendicular to the light polarization direction.

For the polarization blocking element, two preferred embodiments are provided. In one embodiment, the polarization blocking element is formed by a linear polarizer. In the other embodiment, it is formed by a (seventh) retarder layer which acts for the third color band as a quarter-wave plate and a (fifth) cholesteric filter having a selective reflection band for the third color band.

In a preferred embodiment, a supplementary cholesteric filter having a selective reflection band for the first color band and a supplementary retarder layer which is a quarter-wave plate for the first color band is added on the light input side. This embodiment is directly suitable for unpolarized input light. On the other hand, without the supplementary cholesteric filter and retarder layer, input light can be used which is already linearly polarized; this is for instance the case if a polarization recovery scheme is used to illuminate the switchable color filter. Polarization recovery schemes are known using non-absorbing polarizers that-split unpolarized light into two beams of differently polarized light, and then transform the polarization of one beam into the polarization of the other and combine them to a single beam—see for example U.S. Pat. No. 5,235,443.

Further embodiments make use of the advantageous feature of the invention to allow cholesteric filters with overlapping wavelength bands. Preferably, the short-wavelength cutoff of the second cholesteric filter is different from the short-wavelength cutoff of the third cholesteric filter. Advantageously, the long-wavelength cutoff of the first cholesteric filter and the short-wavelength cutoff of the third cholesteric filter are at a substantially equal wavelength, which is shorter than the short-wavelength cutoff of the second cholesteric filter. Preferably, the long-wavelength cutoff of the second cholesteric filter is different from the long-wavelength cutoff of the third cholesteric filter. Advantageously, the long-wavelength cutoff of the third cholesteric filter is at a longer wavelength than the short-wavelength cutoff of the fourth cholesteric filter.

The liquid crystal switchable cells act as a rotatable half-wave plate. Many liquid crystal devices are capable of performing this optical function, in particular DHF-, SSF-, anti-ferroelectric, thresholdless anti-ferroelectric or electroclinic LC cells.

The invention is particularly suitable for a time-sequential color device; it may, however, also be useful as a switchable color filter for other applications.

A liquid crystal switchable color filter according to the invention can be used in projection optics and in direct view optics. A further application is in color video cameras based on the time sequential technique.

The invention solves the problems of the prior art devices described at the beginning and moreover does not unfavorably influence other important parameters such as high brightness.

Since only cholesteric filters of one handedness—either all right-handed or all left-handed—are required, due to the invention the production of a color switch is simplified and the costs are reduced and yet an outstanding performance can be reached.

The color switch design proposed by the invention furthermore advantageously allows to greatly reduce the dependence of the contrast on $\Delta$nd-variations. This can for instance be understood from FIG. 4, which represents a 'cholesteric filter/quarter-wave plate/liquid crystal switch/quarter-wave plate/cholesteric filter' configuration used by the invention. By observing the polarization of light within the selective wavelength range as it passes through the configuration, one can see that the unpolarized input light is circularly polarized by a cholesteric filter 63, and only right (R−) circularly polarized light passes this filter. A quarter-wave plate 65 transforms this light into linearly (p−) polarized light. Depending on the switching state of a liquid crystal switch 67, the plane of linear polarization is rotated by 90° (top) or remains unchanged (bottom). A further quarter-wave plate 69 transforms this light into R− (top) or L− (bottom) circularly polarized light, and a further cholesteric filter 71 is used to block the circularly polarized light of one of the switching states. If for the two cholesteric filters different handedness (L and R) would be used, as it is generally the case in the prior art, the exit cholesteric filter would reflect R-polarized light, i.e. the blocking state would act on R-polarized light. By contrast, in the version used by the invention, where the two cholesteric filters have equal handedness, the exit cholesteric filter 71 blocks L-polarized light (lower case in FIG. 4) and passes R-polarized light (upper case). By observing the state of polarization at the liquid crystal switch we see that in the blocking state the linear polarization is parallel to optical axis of the LC switch, and consequently variations in Δnd have very little influence on the state of polarization of the light. In contrast, in the prior art configuration Δnd has to match exactly the birefringence of the quarter-wave plates, imposing not only stringent production tolerances on the cell gap d, but also requires matched dispersion of the quarter-wave plates and the liquid crystal material. The Δnd-variations are, of course, still present in a switchable color filter according to the invention, but result by analogy in a 3 . . . 5% change of (not the dark but) the bright state transmission, which is far less damaging than the corresponding increase in the blocking state.

Advantageously, with a liquid crystal switchable color filter according to the invention there are no more three independent modulation filters (BMFs), but a single entity that comprises retarders and liquid crystal switches in a way that cannot be described as a stack of independent BMFs, but are best regarded as 'fused' BMFs. FIG. 2 may illustrate such a concept and shows a block 7 of 'fused' BMFs in comparison to the independent BMFs 1, 3 and 5 of FIG. 1. This concept allows to freely choose the bandwidth of each color and to manage the otherwise critical birefringence of the BMF in its blocking state (FIG. 4 bottom). In this respect, a main point is that although light inside the selective reflection range of the filter is blocked, light outside this range should be transmitted without change of polarization. Three independent BMFs of FIG. 4 in series would result in elliptically polarized light with completely different ellipticity that cannot be compensated by simple retarders. However, the invention enables a configuration where, at least in good approximation, the birefringence of the BMF reverses the sign of circular polarization in the blocking state and leaves the polarization unchanged in the transmitting state. In the latter case the total birefringence is either zero or a full wavelength λ. In FIG. 4 the case of zero birefringence is drawn, where for the blocking state the optic axis of the LC cell is parallel to the light polarization direction. Rotating the LC cell by 90° would lead to a retardation of λ. Such a configuration, where for the blocking state the optic axis of the LC cell is perpendicular to the light polarization direction, is also a feasible.

It should be understood that the terms 'half-wave' and 'quarter-wave' as used in the present context are names that help to understand qualitatively the physics of the device. The actual values may differ substantially from the values suggested by these names. The final performance of the liquid crystal switchable color filter is an interplay between the action of the birefringent plates and the cholesteric filters and has to be found by optimizing (for instance numerically) the parameters of the elements involved.

Depending on the precise application, there may be polarizer/retarder combinations added to the light input and/or the light output side. These are indicated in FIG. 1 and 2 as components 9 and 11. Although cholesteric color switches inherently act as polarizers, it can be preferable to use a linear pre-polarizer, and retarders may be required to match the linear polarization accordingly. Such a linear pre-polarizer is for instance desirable in case a polarization recycling scheme is used to increase the light output of the lamp. Likewise, to match the output polarization to the subsequent imager, retarders and optionally 'cleaning polarizers' may be added in order to achieve the high polarization ratios required for high quality projectors.

To adapt the characteristics of a cholesteric filter to the needs of a liquid crystal switchable color filter according to the invention, a cholesteric filter may be of a more complex type than just one layer of a cholesteric liquid crystal. For instance, it may also consist of more than one cholesteric layer, which together act as a circularly polarizing filter having a suitable reflection band, or the pitch of the cholesteric layer may vary over the layer thickness.

For the cholesteric filters preferably liquid crystal polymers and crosslinked networks respectively are used.

Advantageously, the liquid crystal elements of the color filter, that is cholesteric filters, retarders and switches, are aligned by a photo-orientation technique. Among the different known methods particularly well suited will be those using linear photopolymerization (LLP), also sometimes referred to as photooriented polymer network (PPN). Backgrounds and manufacturing of such elements are disclosed in, for example, U.S. Pat. Nos. 5,389,698, 5,838,407, 5,602, 661, EP-A-689084, EP-A-0756193, WO-A-99/49360, WO-A-99/64924, and WO-A-00/36463.

The aforementioned and other embodiments and advantages of the invention can be seen from the claims and the description herein below.

The invention will now be described by way of example with reference to the accompanying drawings, in which.

Figure 5:
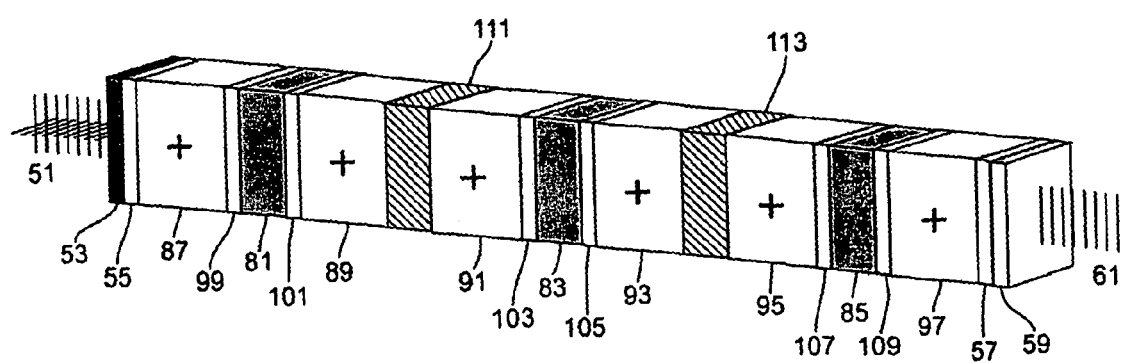
FIG. 5 is a schematic representation of a color switch according to a first embodiment of the present invention.

Referring now to FIG. 5, there is schematically illustrated a liquid crystal switchable color filter forming a first embodiment of the invention. It comprises three ferroelectric liquid crystal switches 81, 83, and 85, and six cholesteric filters 87, 89, 91, 93, 95 and 97. Between each liquid crystal switch and the two cholesteric filters adjacent to it, quarter-wave plates 99, 101, 103, 105, 107 and 109 are inserted, and between the two inner pairs of cholesteric filters, there are provided two half-wave plates 111 and 113.

Figure 1:
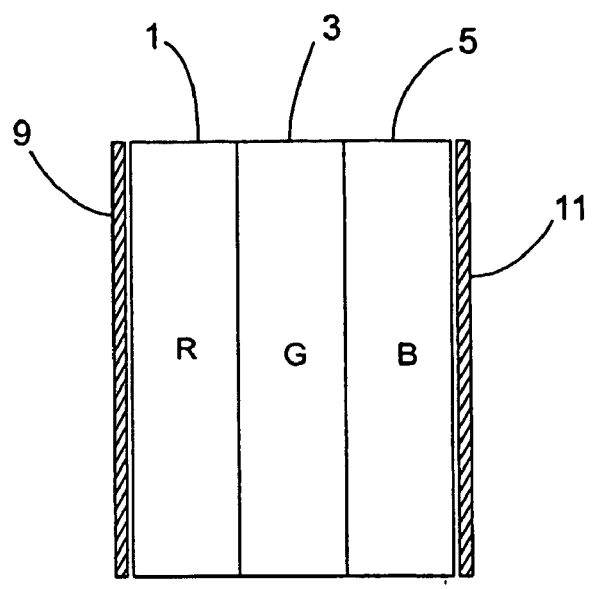
FIG. 1 is a sketch showing the general structure of a known color switch.
Figure 2:
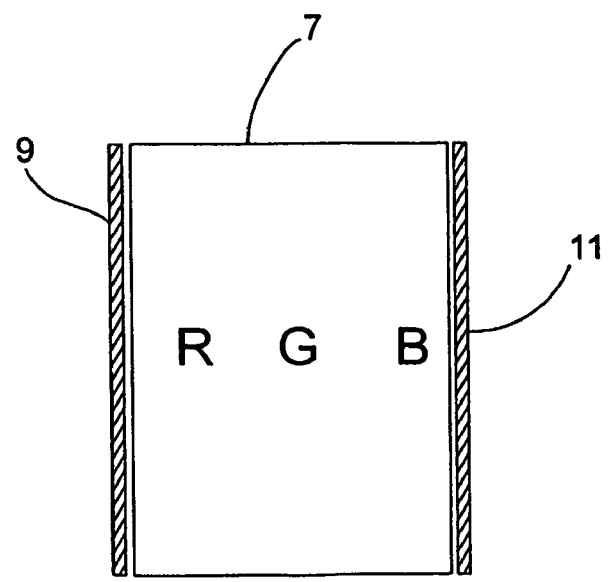
FIG. 2 is a sketch illustrating the concept of 'fused' BMFs in comparison to the independent BMFs of FIG. 1.
Figure 3:
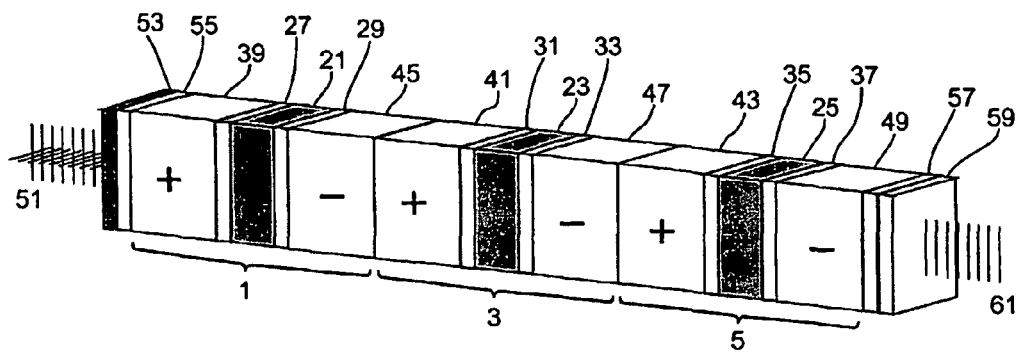
FIG. 3 is a schematic representation of a known color switch comprising three band modulation filters.

Unpolarized light 51 is impinging from the left. As in FIG. 3, optional elements such as a polarizer 53 and a retarder 55 are indicated at the input side, which may for instance be required in combination with a polarization recovery scheme. At the output side, one or more additional retarders 57 and 59 may be provided to convert the circularly polarized light to linearly polarized light 61. At the output, light has identical polarization for all colors.

An important feature of a color switch according to the invention is the fact that all cholesteric filters have the same handedness, indicated in FIG. 5 by the "+"-signs (which have no meaning with regard to the twist sense and could equally well be all "−"-signs). The use of only one handedness is made possible by the insertion of the two half-wave plates 111 and 113. They serve to compensate the half-wave plate character of the preceding band modulation filter.

As already mentioned above, the terms 'half-wave plate' and 'quarter-wave plate' as used in the present context are names that help to understand qualitatively the physics of the device. The actual values are not necessarily an exact quarter of a specifically defined wavelength but are given by optimizing the parameters of the birefringent plates and cholesteric filters of the color switch as a whole.

Figure 6A:
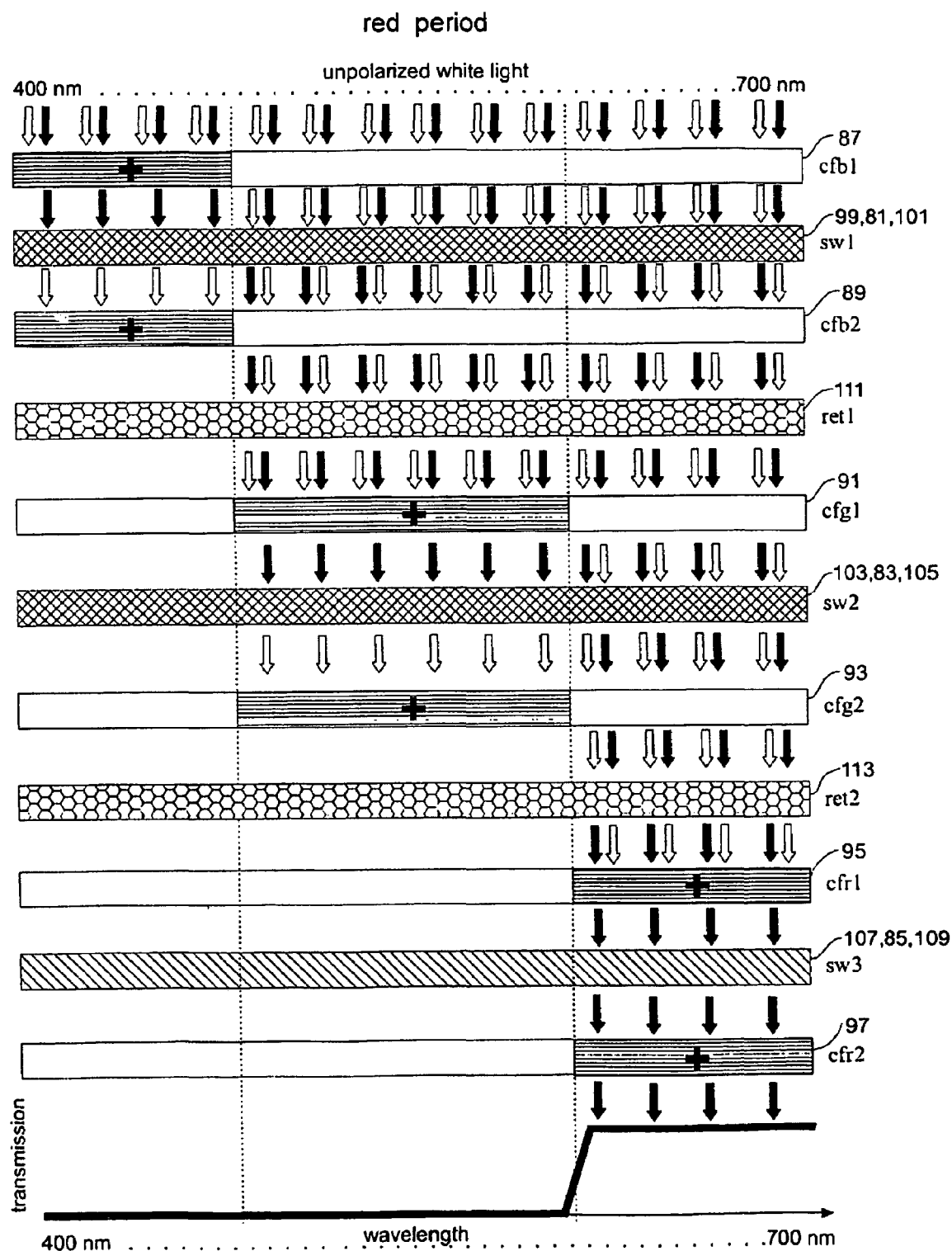
FIG. 6a to 6c are explanatory diagrams showing the basic arrangement and operation of a first embodiment of the present invention.
Figure 6B:
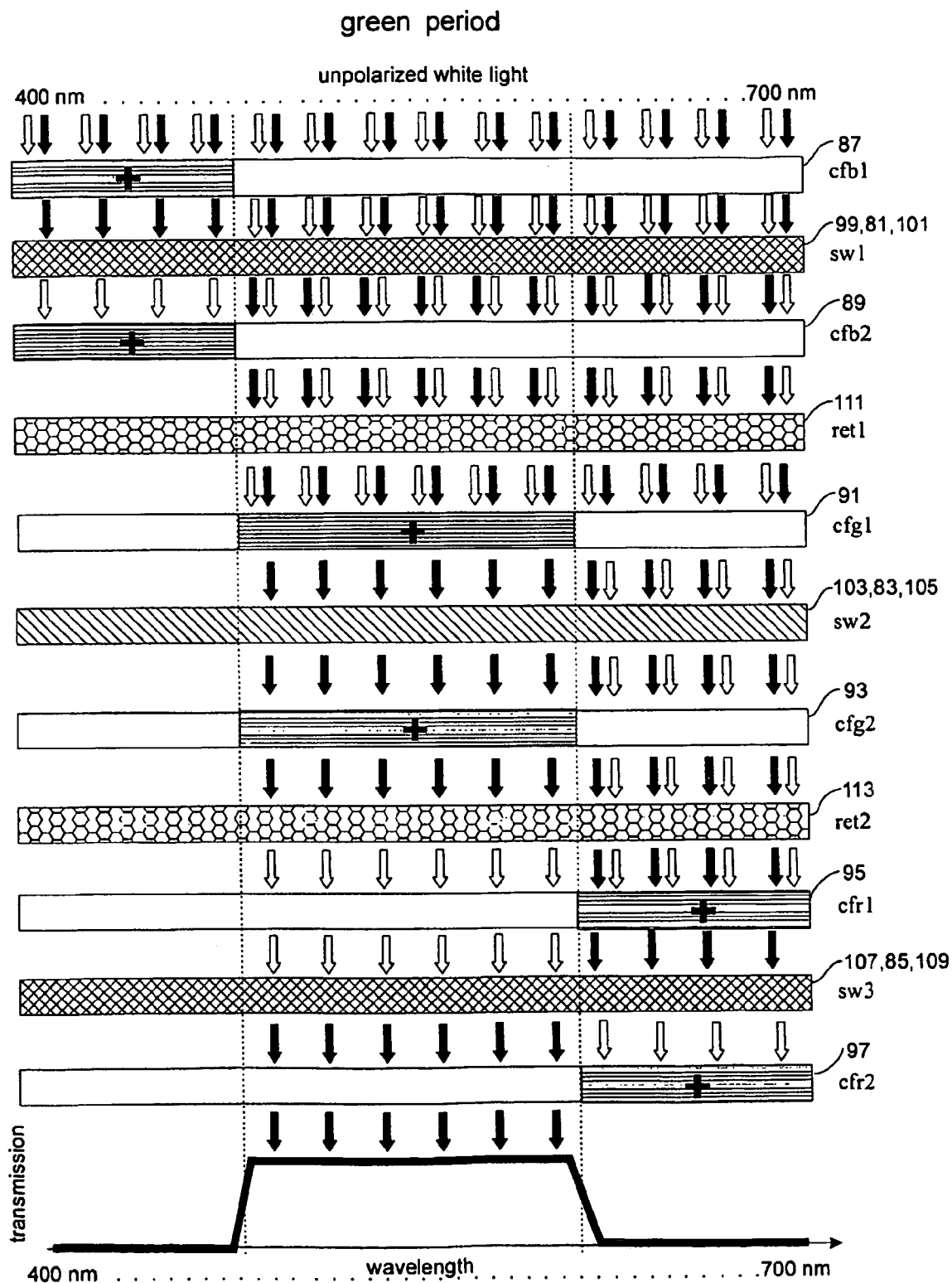
Figure 6C:
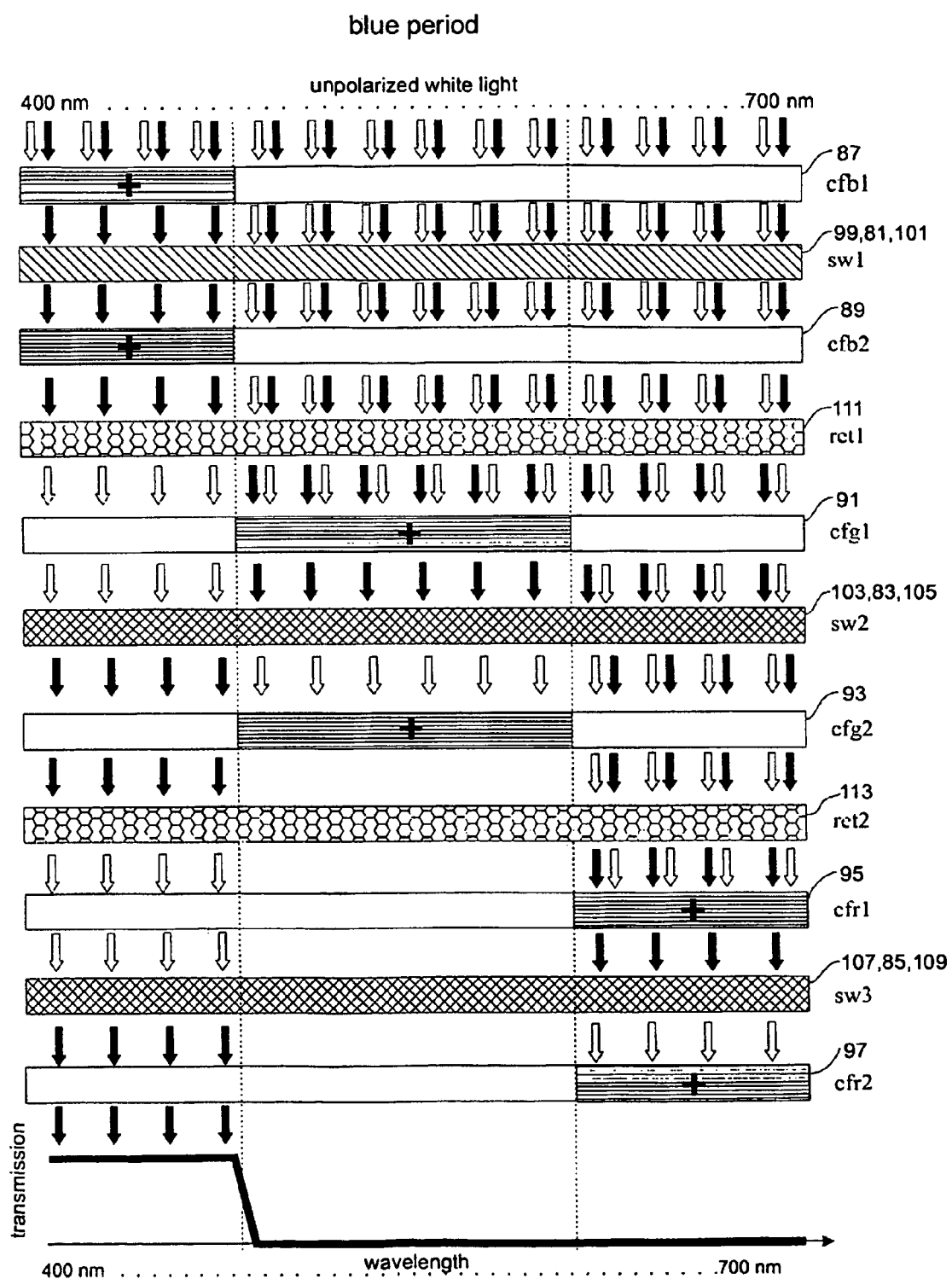

The optical concept of the liquid crystal switchable color filter of FIG. 5 is schematically illustrated in FIG. 6a, 6b and 6c. Each of the figures shows the mode of action for one of the three primary colors (RGB in this example), FIG. 6a for the red period, FIG. 6b for the green period and FIG. 6c for the blue period.

In the figures, unpolarized light is indicated by a white/black pair of arrows, L-circularly polarized light by a single filled black arrow, R-polarized light by a single open arrow. The position of the arrows from left to right indicates its color, ranging from blue (left side) to red (right side).

Corresponding to FIG. 5, the color filter comprises: three times a combination 'quarter-wave plate/liquid crystal switch/quarter-wave plate', for the sake of simplicity referred to as 'switch' and labeled sw1, sw2, and sw3; six cholesteric filters labeled cfb1, cfb2, cfg1, cfg2, cfr1, and cfr2; and two half-wave plates labeled ret1 and ret2. Each of the retarder/switch-combinations, cholesteric filters and half-wave plates are shown as a rectangular box extending from left to right. For each cholesteric filter, the wavelength range of selective reflection is marked within the corresponding box by a filling, and the handedness is indicated by a '+' sign.

In each of the FIG. 6a, 6b and 6c, one of the switches is in the 'on' state (hatched filling, no change of handedness), and two in the 'blocking' state (crosshatched filling, change of handedness). The figures differ only in the color that is switched 'on'.

Let us first discuss the red period (corresponding to FIG. 6a), with the red switch sw3 'on' and the blue switch sw1 and the green switch sw2 'off'.

Unpolarized white light is impinging from the top onto the (blue) cholesteric filter cfb1.

In the blue spectral range, only L-circularly polarized light passes the filter; the R-component is reflected. Light in the green and red spectral range remains unchanged (i.e. unpolarized). Switch sw1 is in the blocking state, that is, it changes the handedness of the light. Since only the blue part of the spectrum is polarized, the change in handedness affects only the blue part of the spectrum, changing the L-polarization to the R-polarization. The next cholesteric filter cfb2, which is substantially identical to cfb1, then blocks this light. Green and red remain unpolarized.

The case of the light in the green spectral range is very similar. The light remains unpolarized after passing through the half-wave plate ret1 until it hits the (green) cholesteric filter cfg1, where only the R-polarized light is passed. Switch sw2 then reverses the polarization and the next cholesteric filter cfg2 then blocks this light.

The case of the light in the red spectral range is different. After passing the blue and green filter sections including the half-wave plates ret1 and ret2 unchanged, the red light is polarized by the (red) cholesteric filter cfr1. The L-component of the red light passes and the R-component is reflected. Switch sw3 is in the 'on' state and leaves the polarization in its L-state. The light then passes the cholesteric filter cfr2, yielding red, L-polarized output light.

The green period (shown in FIG. 6b), where the green switch sw2 is 'on' and the blue switch sw1 and the red switch sw3 are 'off', is slightly more complicated.

For the blue spectral range, there is no change compared to the red period. Similarly, the red spectral range remains unpolarized until it reaches the cholesteric filter cfr1, were only the L-component passes, which is changed to the R-state by the switch sw3 and then blocked by the cholesteric filter cfr2.

The case of the green spectral range is different. After passing the blue filter section including the half-wave plate ret1 unchanged, the green light is polarized by the cholesteric filter cfg1, which passes the L-component only. The green switch in the 'on' state does not change this polarization, and the light passes as L-polarized light the next cholesteric filter cfg2. The half-wave plate ret2 reverses the polarization to R-polarized light. Then, the switch sw3 of the red filter section changes the polarization state of the green light (at least to a first approximation) from R to L. The output is thus L-polarized, green light.

This crucial influence on the green light by the red filter section is in stark contrast to color switches of the prior art using independent band modulation filters, where the green light passes the last band modulation filter unchanged.

Finally, FIG. 6c shows the most difficult case, namely the period of the color of the first filter section. In the present example, this is the blue period, where the blue switch sw1 is 'on' and the green switch sw2 and the red switch sw3 is 'off'.

The red spectral range is blocked as in FIG. 6b and the green spectral range is blocked as in FIG. 6a.

The blue spectral range is L-polarized by the cholesteric filter cfb1, then passes the switch sw1 and the cholesteric filter cfb2 with no change of polarization. Half-wave plate ret1 then reverses the polarization to R-polarized, which remains unchanged by the cholesteric filter cfg1. Next, switch sw2 approximately reverses the polarization again to L, and the half-wave plate ret2 reverses back to R. Finally, switch sw3 reverses the polarization back to L, giving L-polarized blue light output.

Again, the concept of independent band modulation filters does not apply since both the red and the green filter section change the polarization state of the blue spectral range.

In a further embodiment of the invention, it can be used the advantageous possibility of choosing the filter characteristics such that for the cholesteric filters overlapping wavelength bands result. As discussed above, this is important if the light of the lamp should be used efficiently.

Compared to the first embodiment described above, there are two relevant changes in this further embodiment: In the red part, the long-wavelength cutoff of the green filter is at a longer wavelength than the short-wavelength cutoff of the red filter, i.e. the blocking ranges overlap, with the desired result that a defined wavelength band can be blocked completely. Whereas this feature is also possible with the known concept of independent band modulation filters, the green/blue boundary, however, is different. The two blue as well as the two green cholesteric filters have different selective reflection bands. Using the same reasoning as in the discussion of FIG. 6, one finds that the long-wavelength cutoff of the cholesteric filter cfb1 together with the short-wavelength cutoff of the cholesteric filter cfg1 determine the long-wavelength cutoff of the transmitted blue light. Further, one finds that the long-wavelength cutoff of the cholesteric filter cfb2 together with the short-wavelength cutoff of the cholesteric filter cfg2 determine the short-wavelength cutoff of the transmitted blue light. Since these cutoff-wavelengths can be freely chosen, advantageously any desired band-pass characteristics can be implemented.

The design concepts described above are useful and result in switchable color filters of quite good quality. However, the implicit assumption that all switches are half-wave plates for all wavelengths is certainly only approximately true. As a further improvement of a liquid crystal switchable color filter according to the invention, it is therefore proposed to optimize the relative arrangements of the components. To find such an arrangement, for instance an optimizing algorithm can be used.

In a successful example, an algorithm was used, which consists of a routine that calculates the transmission spectra of a given configuration and determines from these data a cost function that is a measure of the quality of the configuration. The cost function is minimal if both, color saturation and brightness are maximized. An optimization routine then varies the original configuration until a minimum is reached for the cost function. The algorithm is described in more detail below.

Figure 7:
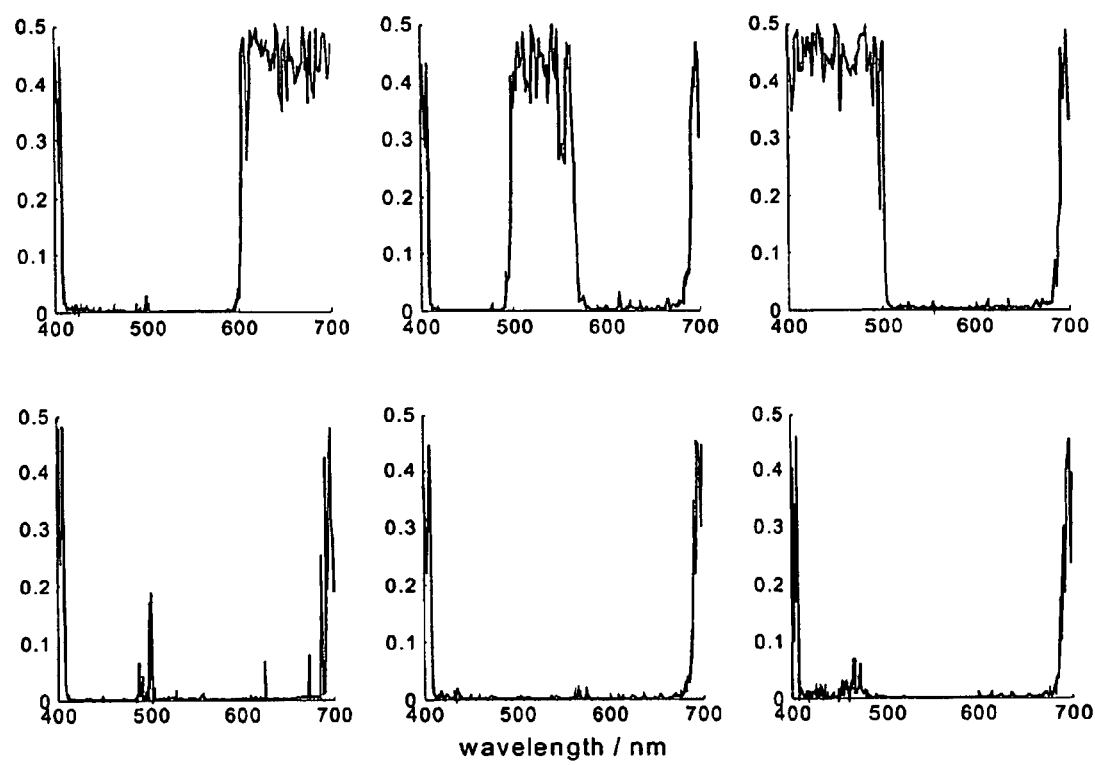
FIG. 7 is a graph showing transmissivities for the three color bands of an embodiment of the invention.
Figure 8:
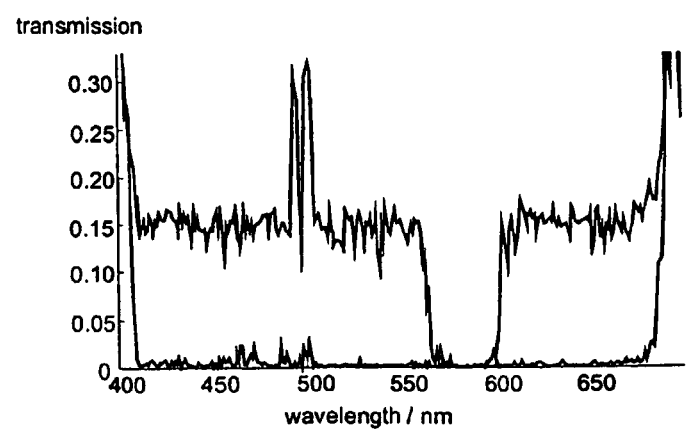
FIG. 8 shows the total time averaged output corresponding to the transmittivity spectra of FIG. 7.
Figure 9:
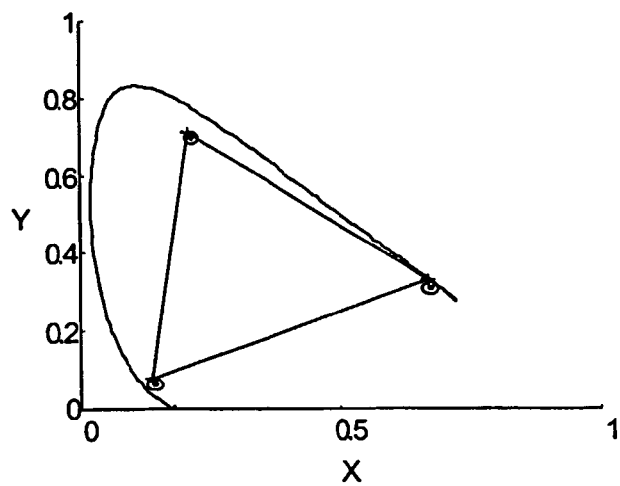
FIG. 9 is a chromaticity diagram showing the color coordinates corresponding to the transmittivity spectra of the top row of FIG. 7, compared to an NTSC TV system.

FIG. 7 and 8 show the result of such an optimization, and FIG. 9 gives the corresponding chromaticity diagram. In FIG. 7, the transmission for unpolarized light is shown, in the top row with an analyzer oriented in the design direction and in the bottom row perpendicular to it. Contrast ratios (ratio of luminance) without an additional polarizer are 31, 88 and 15 for red, green and blue, respectively, and 45 for white. FIG. 8 gives the time-averaged spectra of FIG. 7. FIG. 9 shows the color coordinates of the spectra in the top row of FIG. 7 (open circles) in comparison with the NTSC values (triangle and + signs).

The excellent brightness and the almost perfect color saturation as well as the high degree of polarization are evident from these data. Since the cut-off wavelengths of the cholesteric filters were part of the optimization procedure, these data again illustrate the importance of the overlap of the blue and the green spectral range.

In a variation of the invention, the liquid crystal switchable color filter can also be adapted for input light that is already linearly polarized, as is for instance the case if a polarization recycling scheme is used to illuminate the switchable filter. In fact, the liquid crystal switchable color filter may be simplified in this case: the first cholesteric filter as well as the first quarter-wave plate can be omitted.

Figure 4:
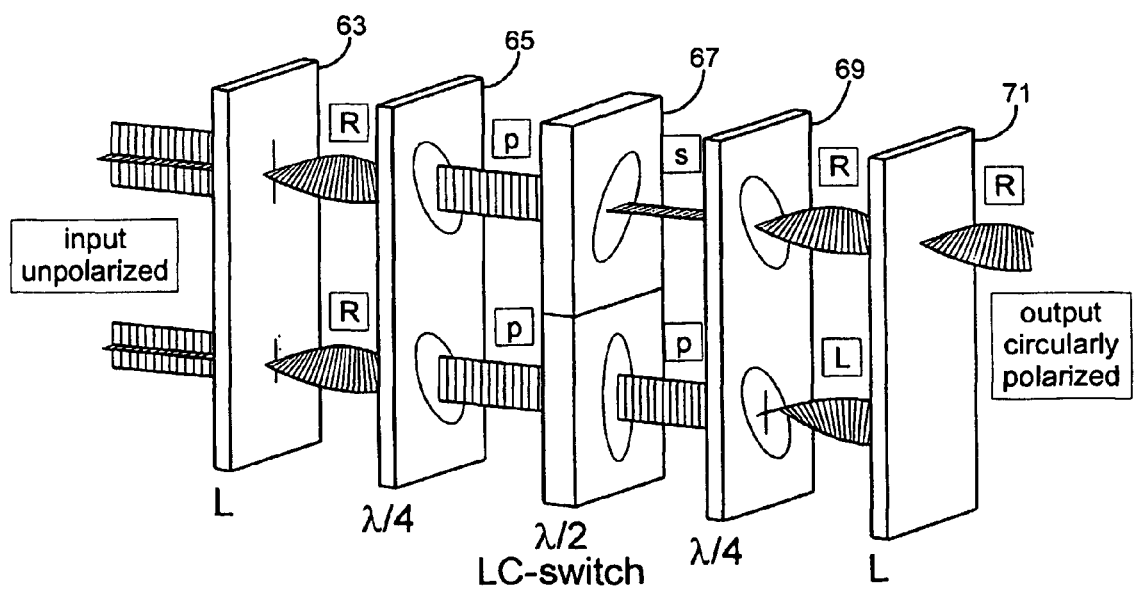
FIG. 4 illustrates a 'cholesteric filter/quarter-wave plate/liquid crystal switch/quarter-wave plate/cholesteric filter' configuration used by the invention.

Similarly, in a further variation of the invention, the last cholesteric filter can be omitted if on the light output side a polarizer is used that can handle the full light intensity (for high intensities e.g. a polarizing beam splitter). From FIG. 6 it can be seen that the last cholesteric filter cfr2 serves to block one red circular polarization. Further, from FIG. 4 showing schematically the principal components of a filter section it can be seen that the needed blocking action can also be achieved by a linear polarizer just after the liquid crystal switch. Thus, the handling of the red spectral range is not changed if the cholesteric filter cfr2 together with the quarter-wave wave plate are replaced by a linear polarizer. To improve the quality of this embodiment, it is however advantageous to make sure that at the same time the remaining spectral ranges (green and blue) are absorbed by the linear polarizer as little as possible. One way to reach this goal is the optimization of the parameters of the remaining components.

Figure 10:
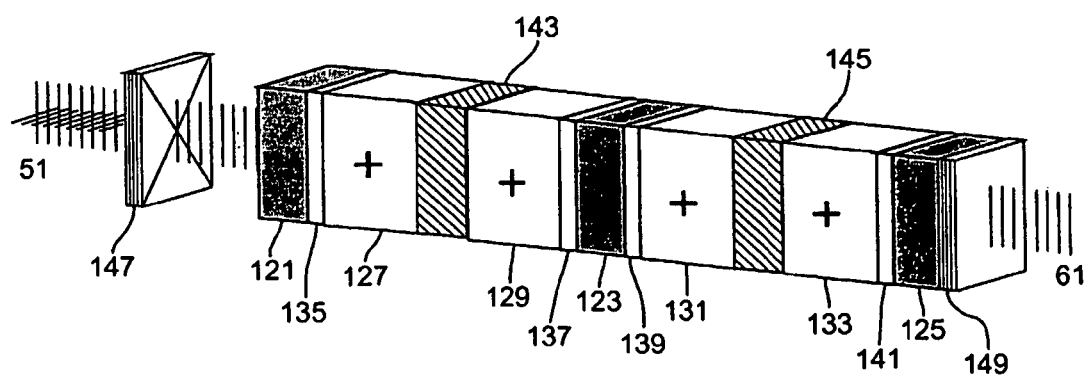
FIG. 10 is a schematic representation of a color switch according to a second embodiment of the present invention, modified as compared with FIG. 5.

FIG. 10 gives an illustration of a color switch according to the variations of the invention just mentioned. It comprises three ferroelectric liquid crystal switches 121, 123, and 125, four cholesteric filters 127, 129, 131 and 133, four quarter-wave plates 135, 137, 139, and 141, two half-wave plates 143 and 145, and two linear polarizers 147 and 149.

Figure 11:
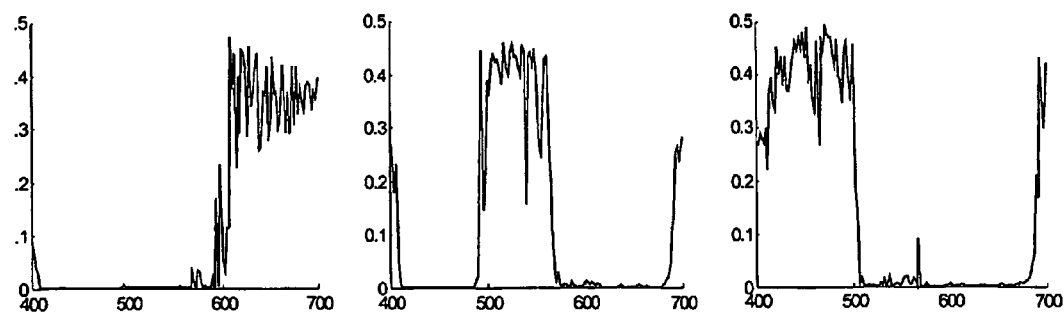
FIG. 11 is a graph showing transmissivities for the three color bands corresponding to the embodiment shown in FIG. 10.
Figure 12:
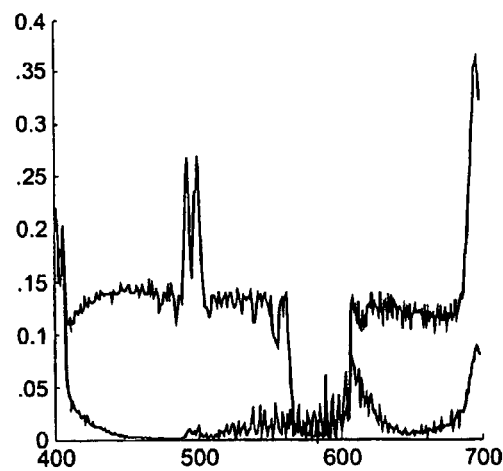
FIG. 12 shows the total time averaged output corresponding to the transmittivity spectra of FIG. 11.
Figure 13:
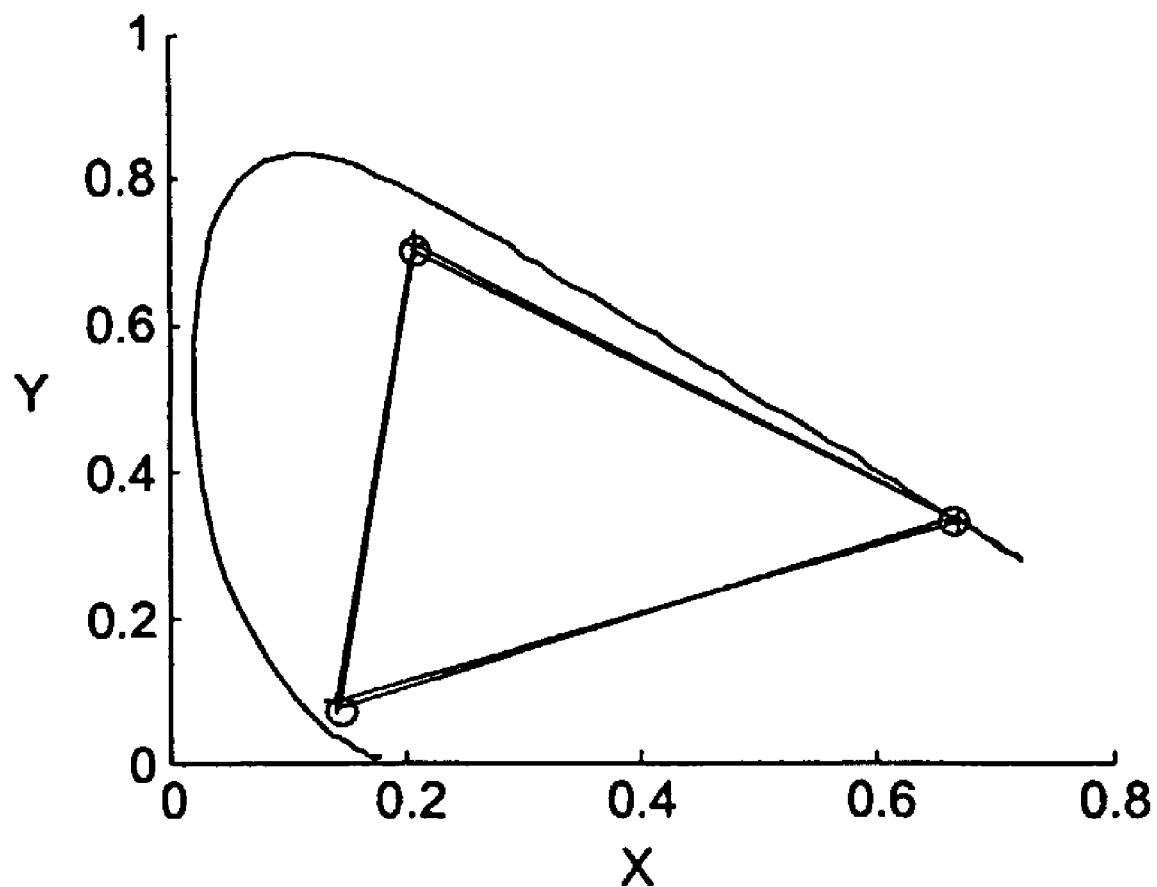
FIG. 13 is a chromaticity diagram corresponding to the transmissivities shown in FIG. 11.

The corresponding spectra shown in FIG. 11 (the three color bands) and FIG. 12 (total time averaged output) as well as the respective chromaticity diagram of FIG. 13 show that also in this case indeed a satisfactory color switch can be designed.

For the calculations in the examples given, the following conditions have been used: The color filters are composed of polarizers, retarders, cholesteric filters and liquid crystal switches. The calculations use a 4×4-matrix formalism. Retarders and cholesteric filters use the same model for the birefringence n, namely $n(\lambda)=n_0+n_1\lambda^2/(\lambda^2-\lambda_0^2)$, using the parameters given in Table I. The liquid crystal switches are surface stabilized ferroelectric (SSF) cells, which have slightly different parameters also shown in Table I.

TABLE I

| parameter | $n_e$ | | | $n_o$ | | |
|---|---|---|---|---|---|---|
| | $n_0$ | $n_1$ | $\lambda_0$ | $n_0$ | $n_1$ | $\lambda_0$ |
| retarders, colesteric filters | 1.368 | 0.262 | 221.2 | 1.205 | 0.324 | 170.92 |
| SSF switch | 1.381 | 0.258 | 224.5 | 1.205 | 0.324 | 170.92 |

In the optimization routine the following cost function G is minimized: Calculate the tristimulus-responses ($X_F$, $Y_F$, $Z_F$, $x_F$, $y_F$) for all three colors F=R,G,B, assuming a white (equal energy per nm bandwidth) light source. In a real application, advantageously the spectrum of the actual light source of the projection system should be used. With the data calculate $$G = \sum_{F=R,G,B} g_{IF}((x_F - x_{FO})^2 + (y_F - y_{FO})^2) + g_{2F}(Y_F - Y_{FO})^2$$

and minimize G by with respect to the above listed parameters. $x_{FO}$ and $y_{FO}$ denote the target values x,y for the color co-ordinates (taken as the NTSC color co-ordinates in our examples) The target values for the brightness, $Y_{FO}$ are determined from the brightness of an ideal color filter. This ideal filter has a transmission of 1 in a given wavelength band and falls off to 0 over 10 nm on each side. The bandwidths of the filter are chosen as wide as possible while still retaining the desired color saturation. Note that for a specific design the actual lamp spectrum has to be employed in this calculation. The resulting brightness of the three colors of these ideal filters is used as target values for the color switch. In our case, the values are 0.12, 0.25 and 0.05 for F=R, G, B respectively. The values of $Y_F$ should be larger than, but close to, the maximum that can be attained for each color. Note that the maximum transmission is 0.5 due to the polarizers. The weight parameters g are chosen interactively, adjusted recursively, such that the size of corresponding terms in G after the optimization are similar (within a factor of ten, preferably three).

A parameter set of components involved in an example according to the first embodiment of the invention is given in Table II.

In the table, angles are given with respect to the direction of the output (design–) polarization.

The invention claimed is:

1. A liquid crystal switchable color filter for switching between a first, a second and a third color band, with a light path having a light input side and a light output side, the color filter comprising:
   a first switchable liquid crystal cell (81; 121) capable of at least two switching states;
   a first retarder layer (101; 135) which acts for the first color band as a quarter-wave plate;
   a first cholesteric filter (89; 127) having a selective reflection band for the first color band; a second cholesteric filter (91; 129) having a selective reflection band for the second color band;
   a second retarder layer (103; 137) which acts for the second color band as a quarter-wave plate;
   a second switchable liquid crystal cell (83; 123) capable of at least two switching states;
   a third retarder layer (105; 139) which acts for the second color band as a quarter-wave plate;
   a third cholesteric filter (93; 131) having a selective reflection band for the second color band;
   a fourth cholesteric filter (95; 133) having a selective reflection band for the third color band;
   a fourth retarder layer (107; 141) which acts for the third color band as a quarter-wave plate;
   a third switchable liquid crystal cell (85; 125) capable of at least two switching states; and

TABLE II

Parameters used in the calculations of the data shown in FIG. 7 to 9

| Component | thickness/μ | angle red period/° | angle green period/° | angle blue period/° | center wavelength/nm | cholesteric helix # turns |
|---|---|---|---|---|---|---|
| Cholesteric filter | | | | | 425 | 20 |
| Cholesteric filter | | | | | 448 | 20 |
| Cholesteric filter | | | | | 473 | 20 |
| Cholesteric filter | | | | | 493 | 20 |
| Quarter-wave plate | 0.876 | −54.5 | −54.5 | −54.5 | | |
| FE switch (SSF) | 1.653 | 80.5 | 80.5 | 35.5 | | |
| Quarter-wave plate | 0.876 | −54.5 | −54.5 | −54.5 | | |
| Cholesteric filter | | | | | 425 | 20 |
| Cholesteric filter | | | | | 448 | 20 |
| Cholesteric filter | | | | | 473 | 20 |
| half-wave plate | 1.645 | 77.6 | 77.6 | 77.6 | | |
| Cholesteric filter | | | | | 580 | 18 |
| Cholesteric filter | | | | | 550 | 18 |
| Cholesteric filter | | | | | 523 | 18 |
| Quarter-wave plate | 1.060 | −132.4 | −132.4 | −132.4 | | |
| FE switch (SSF) | 1.999 | 2.6 | −42.4 | 2.6 | | |
| Quarter-wave plate | 1.060 | −132.4 | −132.4 | −132.4 | | |
| Cholesteric filter | | | | | 580 | 18 |
| Cholesteric filter | | | | | 550 | 18 |
| Cholesteric filter | | | | | 523 | 18 |
| Cholesteric filter | | | | | 493 | 20 |
| half-wave plate | 2.379 | 96.8 | 96.8 | 96.8 | | |
| Cholesteric filter | | | | | 587 | 15 |
| Cholesteric filter | | | | | 626 | 15 |
| Cholesteric filter | | | | | 665 | 15 |
| Quarter-wave plate | 1.369 | −61.1 | −61.1 | −61.1 | | |
| FE switch (SSF) | 2.583 | 28.9 | 73.9 | 73.9 | | |
| Quarter-wave plate | 1.369 | −61.1 | −61.1 | −61.1 | | |
| Cholesteric filter | | | | | 587 | 15 |
| Cholesteric filter | | | | | 626 | 15 |
| Cholesteric filter | | | | | 665 | 15 |
| Retarder | 1.327 | 92.3 | 92.3 | 92.3 | | |
| Retarder | 2.654 | 24.4 | 24.4 | 24.4 | | | a polarization blocking element (149; 109, 97); characterized in that all cholesteric filters have the same handedness;

a fifth retarder layer (111; 143) which acts as a half-wave plate is provided between the first cholesteric filter (89; 127) and the second cholesteric filter (91; 129) and a sixth retarder layer (113; 145) which acts as a half-wave plate is provided between the third cholesteric filter (93; 131) and the fourth cholesteric filter (95; 133); and for the blocking state of the respective color band the optic axis of the corresponding switchable liquid crystal cell is either substantially parallel or substantially perpendicular to the light polarization direction.

2. A liquid crystal switchable color filter according to claim 1, wherein the polarization blocking element is formed by a linear polarizer (149).

3. A liquid crystal switchable color filter according to claim 1, wherein the polarization blocking element is formed by a seventh retarder layer (109) which acts for the third color band as a quarter-wave plate and a fifth cholesteric filter (97) having a selective reflection band for the third color band.

4. A liquid crystal switchable color filter according to claim 1, which comprises, added on the light input side, a supplementary cholesteric filter (87) having a selective reflection band for the first color band and a supplementary retarder layer (99) which acts for the first color band as a quarter-wave plate.

5. A liquid crystal switchable color filter according to claim 1, wherein the cutoff wavelengths of the selective reflection band of the cholesteric filters are chosen such that at least two of the first, second and third color bands overlap in its transmissive state.

6. A liquid crystal switchable color filter according to claim 1, wherein the short-wavelength cutoff of the second cholesteric filter (91; 129) is different from the short-wavelength cutoff of the third cholesteric filter (93; 131).

7. A liquid crystal switchable color filter according to claim 1, wherein the long-wavelength cutoff of the first cholesteric filter (89; 127) and the short-wavelength cutoff of the third cholesteric filter (93; 131) are at a substantially equal wavelength, which is shorter than the short-wavelength cutoff of the second cholesteric filter (91; 129).

8. A liquid crystal switchable color filter according to claim 1, wherein the long-wavelength cutoff of the second cholesteric filter (91; 129) is different from the longwavelength cutoff of the third cholesteric filter (93; 131).

9. A liquid crystal switchable color filter according to claim 1, wherein the long-wavelength cutoff of the third cholesteric filter (93; 131) is at a longer wavelength than the short-wavelength cutoff of the fourth cholesteric filter (95; 133).

10. A liquid crystal switchable color filter according to claim 1, wherein at least one of the switchable liquid crystal cells is of a Surface Stabilized Ferroelectric (SSF) type.

11. A liquid crystal switchable color filter according to claim 1, wherein at least one of the switchable liquid crystal cells is of a Deformed Helix Ferroelectric (DHF) type.

12. A liquid crystal switchable color filter according to claim 1, wherein at least one of the switchable liquid crystal cells is of an anti-ferroelectric type.

13. A liquid crystal switchable color filter according to claim 1, wherein at least one of the switchable liquid crystal cells is of a thresholdless anti-ferroelectric type.

14. A liquid crystal switchable color filter according to claim 1, wherein at least one of the switchable liquid crystal cells is of an electroclinic type.

15. A liquid crystal switchable color filter according to claim 1, which comprises on the light output side an additional cleaning polarizer.

16. A time-sequential. color device containing a liquid crystal switchable color filter according to claim 1.

17. An optical projection device containing a liquid crystal switchable color filter according to claim 1.

18. A direct view display containing a liquid crystal switchable color filter according to claim 1.

19. A video camera containing a liquid crystal switchable color filter according to claim 1.

* * * * *